Mar. 20, 1923.

W. A. FOWLER

STAGE SETTING

Filed Apr. 12, 1921

INVENTOR
William A. Fowler
By W. W. Williamson, Atty.

Patented Mar. 20, 1923.

1,449,170

UNITED STATES PATENT OFFICE.

WILLIAM A. FOWLER, OF LOWELL, INDIANA.

STAGE SETTING.

Application filed April 12, 1921. Serial No. 460,650.

*To all whom it may concern:*

Be it known that I, WILLIAM A. FOWLER, a citizen of the United States, residing at Lowell, in the county of Lake and State of Indiana, have invented new and useful Improvements in a Stage Setting, of which the following is a specification.

My invention relates to new and useful improvements in a stage setting, and has for its object to provide means for producing a scenic illusion comprising a back drop or curtain having a scene represented thereon including a bill board and having flexible flaps connected thereto in the region of the bill board adapted to be rolled upon a suitable member or roller to give the effect of unrolling a roll of paper.

Another object of the invention is to provide a back drop or curtain having the representation of poster bills normally covered by flexible flaps also representing poster bills the latter adapted to be rolled up so as to gradually cover the front face thereof and uncover or disclose the representation of the poster bill behind the flap thereby producing the illusion of pasting one poster bill over another.

Another object of the invention is to provide the representation of the poster bills on the back drop, said frame having distinguishing elements or colored to plainly distinguish the same from other parts of the scene and provide a portion of the flexible flaps with the same distinguishing elements so that when the latter are entirely rolled these distinguishing elements on the flaps will be exposed in the region of portions of the frame to produce the illusion that the rolled flaps form a part of said frame.

A further object of the invention is to provide a back drop or curtain having a scene painted or represented thereon, said scene including the representation of a bill board, said back drop or curtain having openings or doorways therethrough in the region of which are placed suitable frames carrying hinged sectional barriers on the front faces of which are pictures representing poster bills which are normally covered by flexible flaps having pictures thereon to represent other poster bills and to provide means for actuating said flaps so that the pictures thereon will be gradually covered and the pictures on the barriers simultaneously uncovered.

With these ends in view, this invention consists in the details of construction and combination of elements hereinafter set forth and then specifically designated by the claims.

In order that those skilled in the art to which this invention appertains, may understand how to make and use the same, I will describe its construction in detail, referring by numerals to the accompanying drawings forming a part of this application, in which:—

Figure 1:
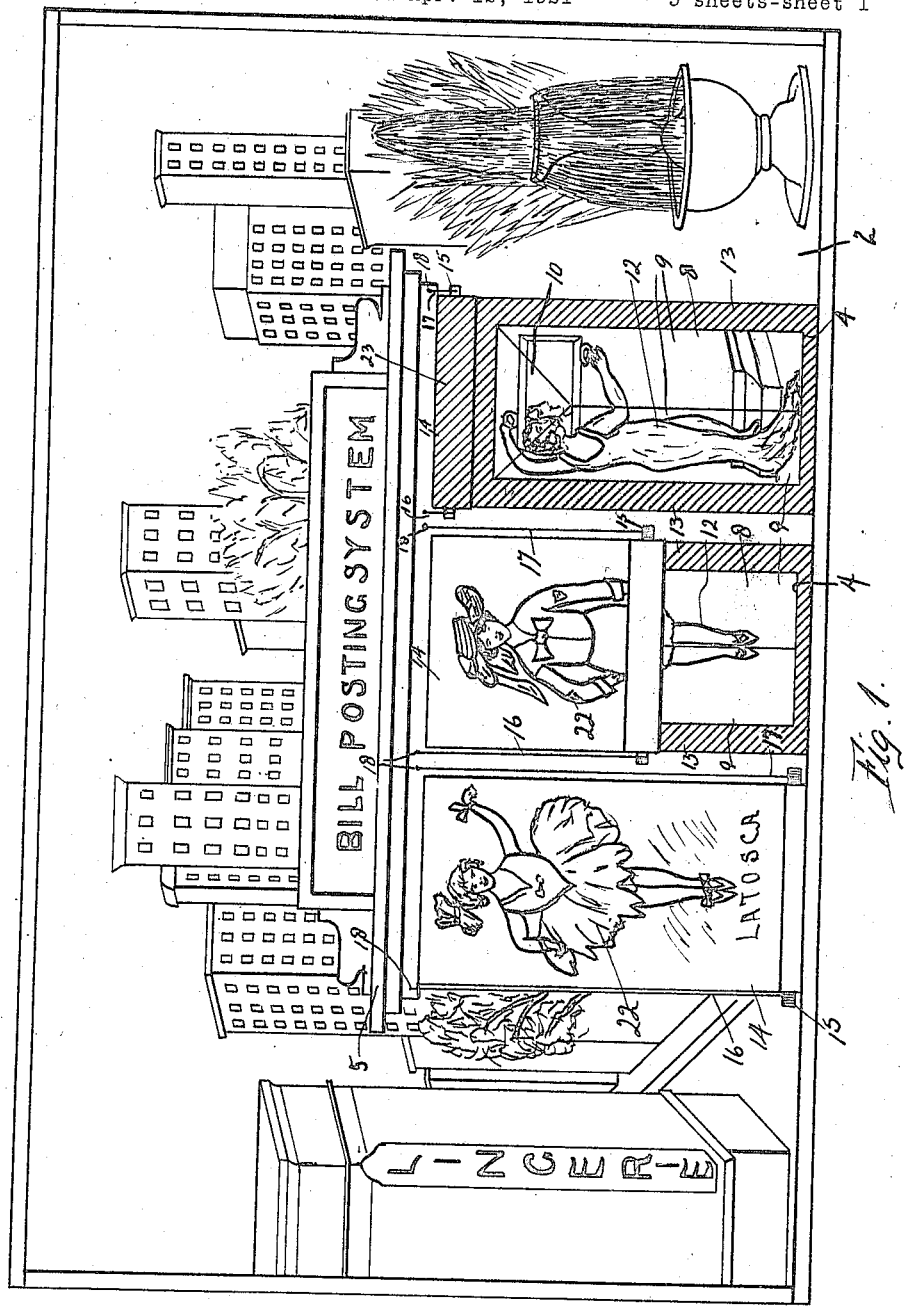
Fig. 1, is a face view or front elevation of a back drop or curtain embodying my invention showing a number of flexible flaps one of which is in its full lowered position, another in a partly raised position and the other in a full raised position.

In carrying out my invention as here embodied, 2 represents a back drop or curtain having a batten 3 secured to its upper edge and having a number of openings or doorways 4 therethrough formed by cutting out portions of the curtain material and on the front of this back drop or curtain is represented a suitable scene, such as for instance a street scene of a city and this scene includes the representation of a bill board 5 in the region of the openings 4 so that the latter are within the confines of said represented bill board.

At the back of the back drop or curtain are arranged the frames 6 one of which is provided for each of the openings 4 on the back drop and are temporarily and detachably connected with the back drop in any suitable and well known manner but are supported by means of cords 7 or their equivalent from the batten 3 so as to relieve the back drop of carrying the weight thereof.

Within each of these frames is hinged a sectional barrier 8 consisting of two side members 9 and a top member 10 each connected with a portion of its frame by means of hinges 11 which are preferably the well known spring hinges in order to normally hold the different sections in their closed positions so as to close the openings through a back drop.

On the front face of each of these sectional barriers is a picture 12 such as that of an actress and is preferably a facsimile of the performer who during the performance is to enter upon the stage through such barrier.

Each of the barriers with the picture thereon is surrounded by a distinctive border or frame 13, here represented as a painted border of a green color, but it is to be understood that I am not limited to the particular color, shade or design that might be utilized.

On the outer face of the back drop and in the region of each barrier is arranged a flexible flap 14 adapted to be moved across said barriers in any desirable direction, but for convenience of illustration I have shown said flaps as movable upward across said barriers in which case the upper ends of said flaps are attached to the back drop above each barrier the same being preferably permanently fastened in place. To the lower end of each flap is fastened a roller or member 15 which is preferably a wooden bar circular in cross section with each end projecting beyond the edges of its respective flap and on these projecting ends are wound the cords 16 and 17 and which pass through holes 18 in the back drop above the point of attachment of the flap to said back drop and through holes 19 in the frame 6 the two cords being brought together and fastened in any suitable manner as to a ring 20 which when the flap is entirely rolled up, as shown at the right hand side of Fig. 1, may be caused to engage a suitable retaining device 21 such as a nail or hook so that the flap may be maintained from its raised position as will be obvious.

On the outer or front face of each flap is a picture 22 representing a poster bill and being the representation of some actress or performer, while the upper portion of the reverse surface of each flap is painted or provided with an agent to harmonize with the border or frame 13 as indicated by the numeral 23 in this case being represented as painted green the same as the border or frame while the balance or major portion of the reverse surface of said flap is white so as to represent the unprinted side of a poster bill whereby during the rolling of the flap across the barrier it will produce the illusion of unrolling a poster bill which when it reaches its uppermost position will blend with the border or frame and thus produce the illusion of having completely unrolled the poster bill.

Figure 2:
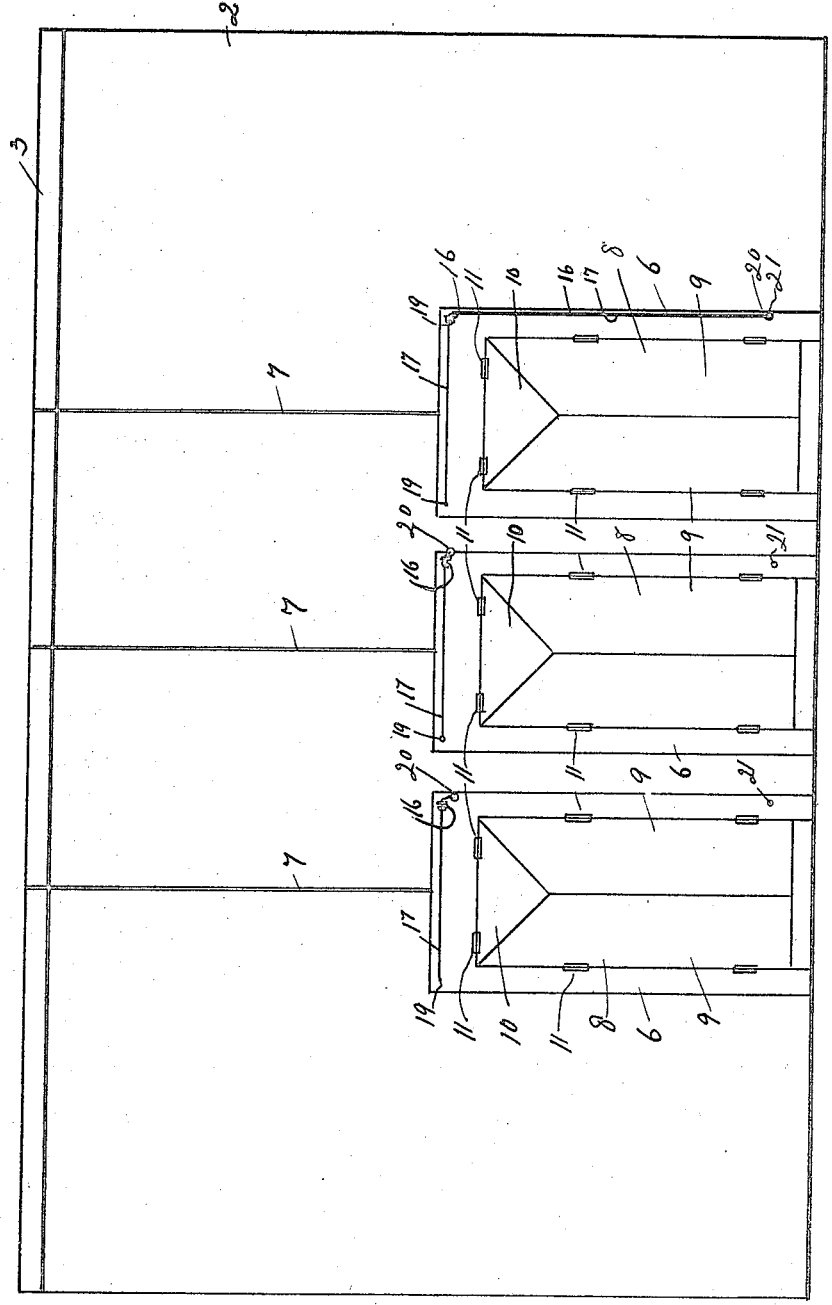
Fig. 2, is a back or rear elevation thereof.
Figures 3, 4, 5:
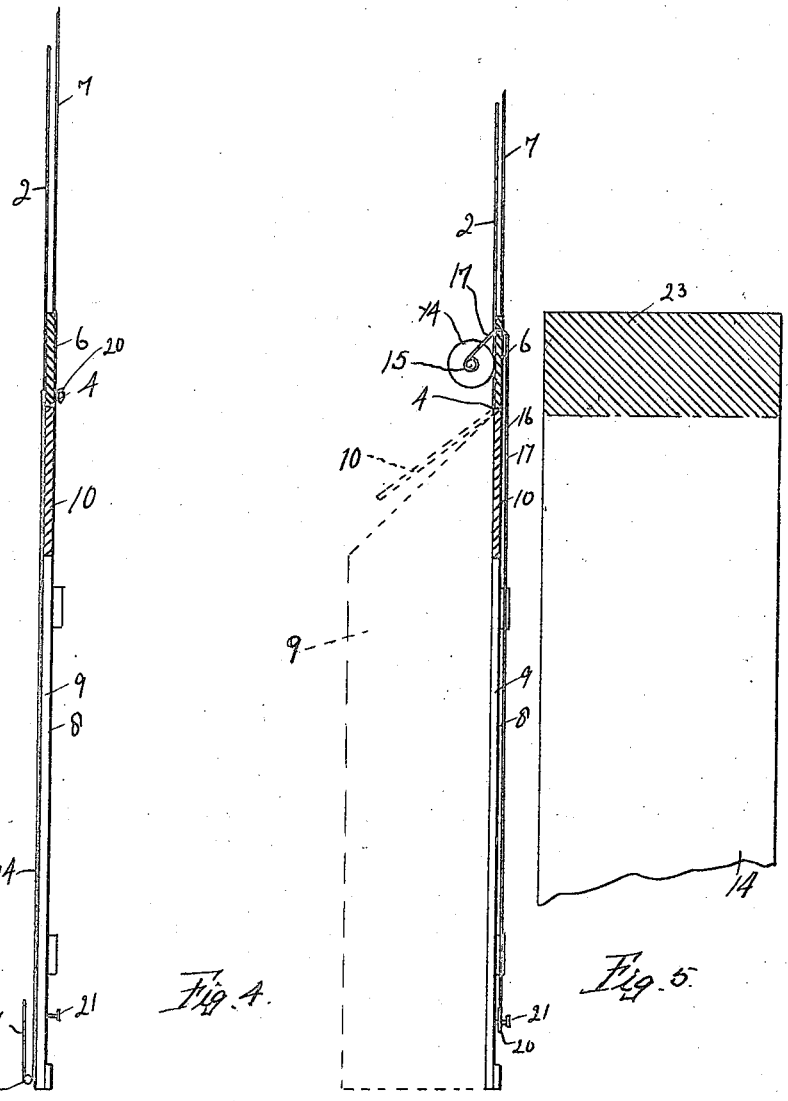
Fig. 3, is an enlarged fragmentary vertical sectional view through the back drop in the region of one of the barriers showing its associated flap in lowered position.
Fig. 4, is a similar view showing the flexible flap entirely rolled up and illustrating in dotted lines the open position of the sectional barrier to permit the passage of a performer through the back drop or curtain onto the stage in front thereof.
Fig. 5, is a fragmentary back view of one of the flexible flaps illustrating the same as having a portion distinctively marked to coincide with curtain distinguishing features on the back drop or curtain with which it is used.

In actual practice when the stage curtain is raised the back drop is in the position shown in Figs. 1 and 2 with all of the flaps in their lowered positions, as shown at the left hand side of Fig. 1. The actor representing a person who hangs poster bills then enters upon the stage carrying the rolls of paper representing poster bills rolled up when by taking one of these rolls and going through the actions of pasting a poster bill he will gradually roll up the flexible flap and at the proper time discard the roll of paper which he is carrying as for instance by sliding it under the flap and allowing it to pass through the barrier in back of the back drop then by continuing the actions representing bill posting the flap will be gradually rolled up and moved across the barrier covered thereby, thereby gradually covering the picture on said flaps and disclosing the one on the barrier which will produce the illusion of unwinding the original roll of paper and pasting the same on the bill board and while this is being done the slack in the cords 16 and 17 is taken up by a confederate in back of the back drop. When the flap is entirely rolled up the paint or harmonizing agent on the reverse face of the flap at its upper end will be disclosed giving the appearance that the same is a part of the frame or border surrounding the picture on the barrier and producing the illusion that the end of the roll of paper has been reached and completely pasted in place. After the flap has been entirely removed from across the barrier an actress or performer may enter upon the stage by pushing the barrier outward so as to open the passageway through the back drop the sections of said barrier being returned to their normal positions by means of the spring hinges 11 hereinbefore mentioned and if found desirable this performer may be dressed to represent a facsimile of the picture on the barrier.

From the foregoing it will be seen that I have provided means for producing the illusion of pasting poster bills upon a bill board overcoming the necessity of using paste and a separate sheet of paper or a poster bill each time the act is performed.

Of course I do not wish to be limited to the exact details of construction as herein shown as these may be varied within the limits of the appended claims without departing from the spirit of my invention.

Having thus fully described my invention, what I claim as new and useful is:—

1. A means for producing a scenic illusion comprising a back drop having the representation of a bill board thereon with the representation of a poster bill on the bill board, a flexible flap disposed across said representation of the poster bill and means to roll up said flap across the back drop in the region of the bill board representation.

2. A means for producing a scenic illusion comprising a back drop having the representation of a bill board thereon with the representation of a poster bill on the bill board and a flexible flap having the representation of a poster bill on the obverse face thereof disposed across the first mentioned representation of a poster bill and adapted to be rolled up and off of the back drop to produce the effect of pasting one poster bill over another.

3. A means for producing a scenic illusion comprising a back drop having a scene thereon and a flexible flap disposed across a portion of said scene and having a picture on the obverse surface thereof adapted to be rolled up over said scene to gradually cover the picture contained thereon and simultaneously disclose a portion of the aforementioned scene.

4. A means for producing a scenic illusion comprising a back drop, flexible flaps superimposed on the back drop, said back drop and flaps having different pictures thereon and means to roll up one end of each flap across the back drop for exposing the pictures on the back drop simultaneously with the covering of those on the flaps whereby the pictures appear to become substituted.

5. A means for producing a scenic illusion comprising a back drop having openings therethrough and provided with a scene on the obverse face thereof, said scene including the representation of a bill board having borders pictured thereon surrounding the openings and a batten to which the back drop is connected, frames hung from said batten and positioned in the region of the openings through the back drop and coacting with the reverse face of said back drop, sectional barriers hinged to said frames and aligning with the openings through the back drop, said barriers having pictures thereon surrounded by the aforementioned border and flexible flaps having pictures thereon secured to the obverse face of the back drop and disposed across the barriers and adapted to be rolled thereacross whereby the pictures on the flaps appear to become covered and the pictures on the barriers appear to be merely placed in position.

6. A means for producing a scenic illusion comprising a back drop having openings therethrough and provided with a scene on the obverse face thereof, said scene including the representation of a bill board having borders pictured thereon surrounding the openings and a batten to which the back drop is connected, frames hung from said batten and positioned in the region of the openings through the back drop and coacting with the reverse face of said back drop, sectional barriers hinged to said frames and aligning with the openings through the back drop, said barriers having pictures thereon surrounded by the aforementioned border, flexible flaps having pictures on their obverse faces and the representation of a portion of the borders or frames on the bill board on their reverse faces at their upper ends whereby when said portion of the reverse faces are exposed such portions will harmonize with the borders, said flaps being attached to the back drop along their upper edges above the barriers, a roll attached to the lower end of each flap, and means for selectively rolling up said flaps whereby the pictures thereon are gradually covered and the pictures on the barriers simultaneously disclosed to represent the unrolling and pasting of a poster bill over another.

7. In a device of character stated, a back drop having openings therethrough normally closed by a barrier through which a performer may pass to enter upon the stage, said barrier having a picture thereon representing the performer.

8. In a device of the character stated, a back drop having openings therethrough normally closed by a barrier through which a performer may pass to enter upon the stage, said barrier having a picture thereon representing the performer, and a flexible flap having a picture thereon normally covering the picture on the barrier and adapted to be rolled off the barrier to produce the illusion of pasting one picture over another and uncover the barrier to permit the performer to pass the barrier.

In testimony whereof, I have hereunto affixed my signature.

WILLIAM A. FOWLER.